B. F. DELK.
D-HANDLE FINISHING MACHINE.
APPLICATION FILED NOV. 3, 1916.

1,260,344.

Patented Mar. 26, 1918.
10 SHEETS—SHEET 1.

Witnesses

B. F. Delk
Inventor by
Attorneys

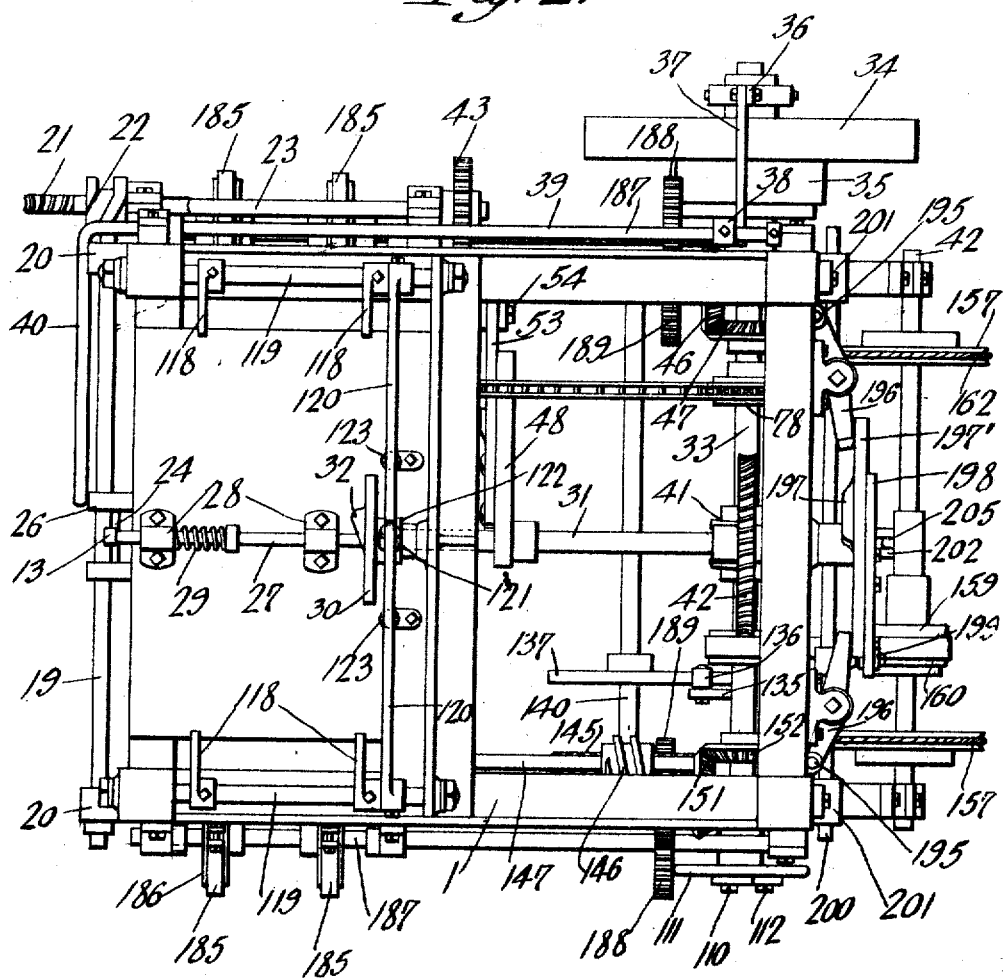

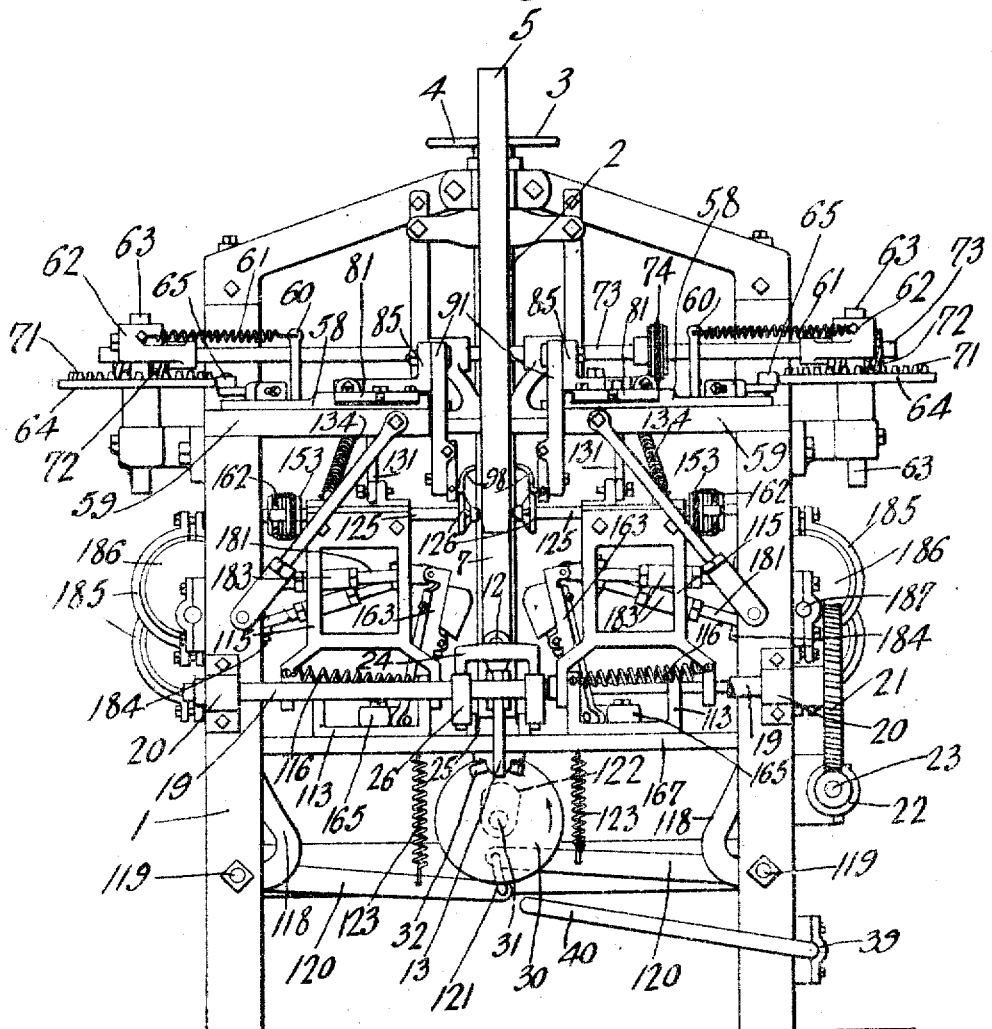

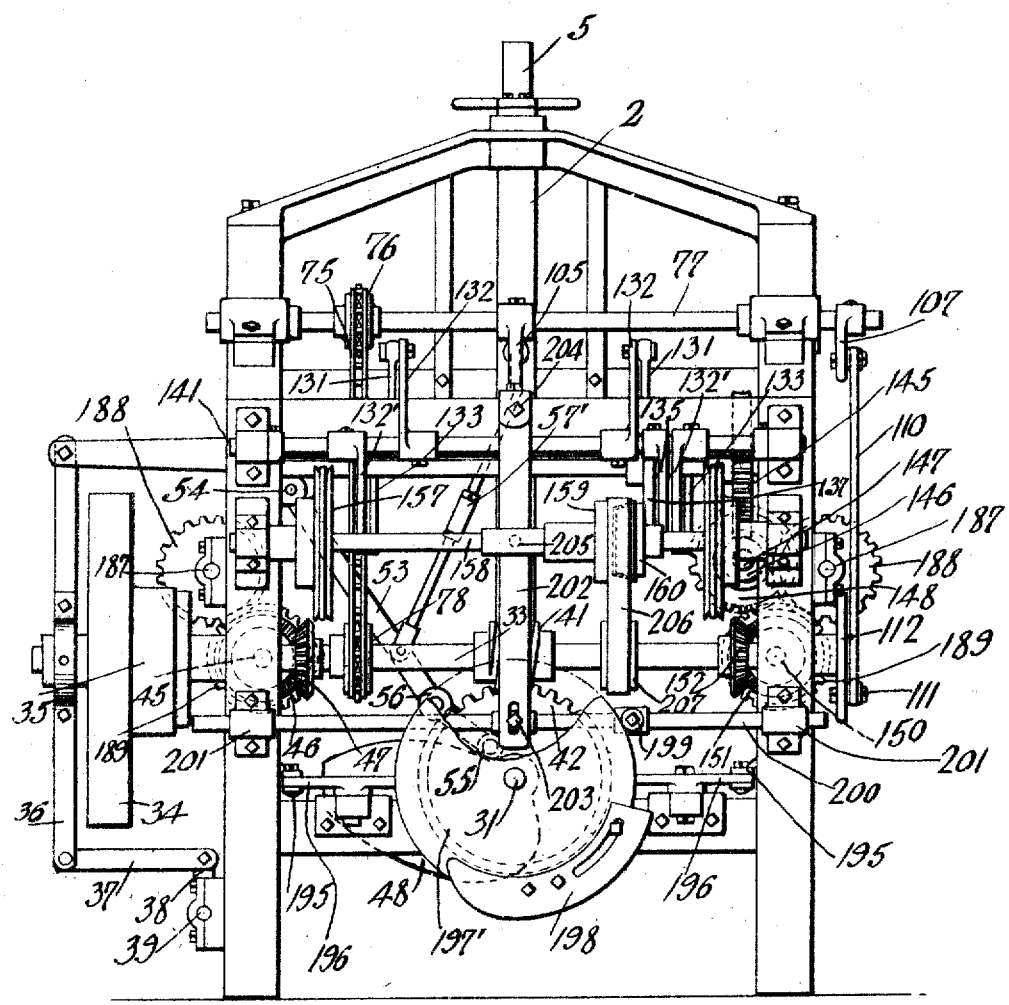

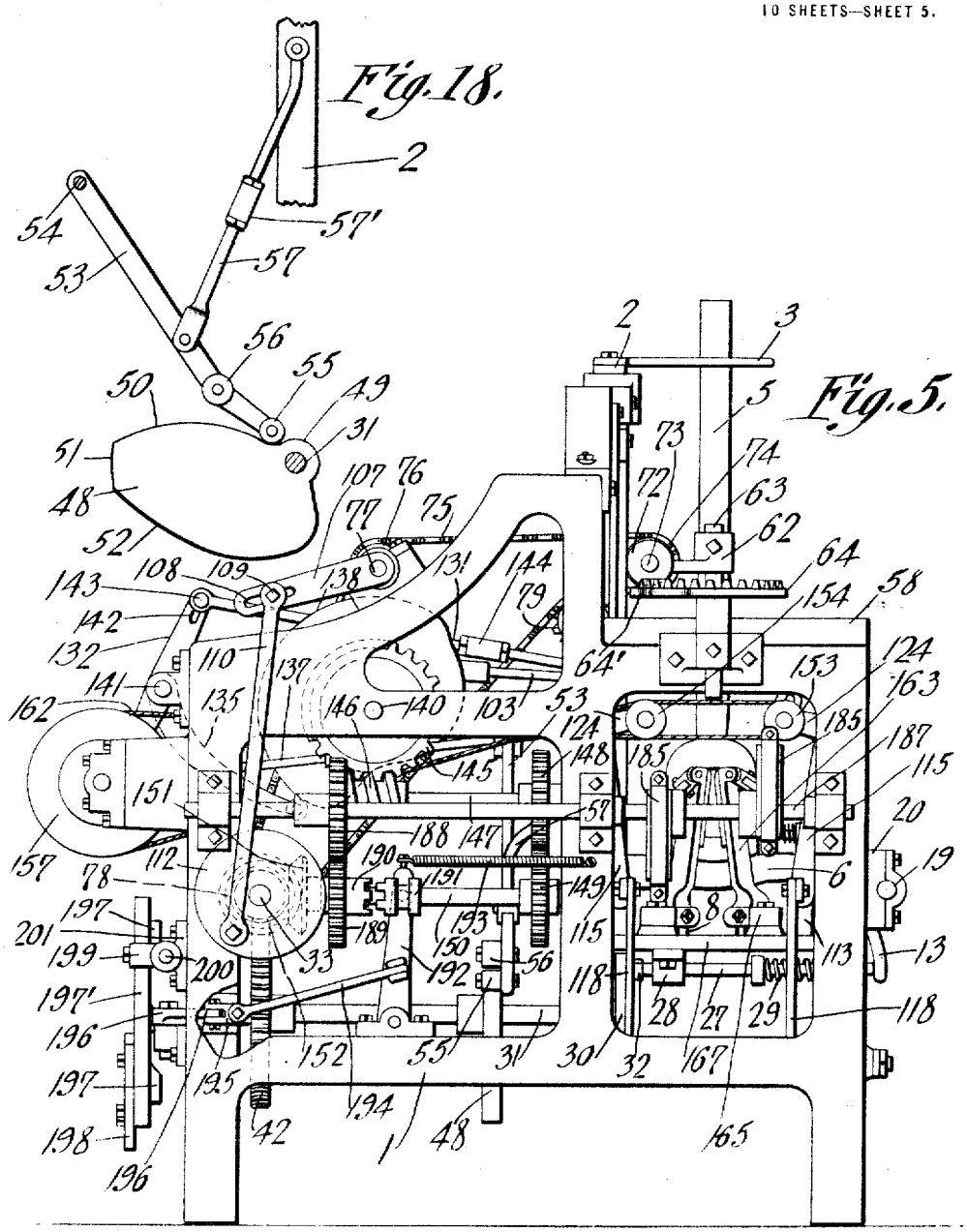

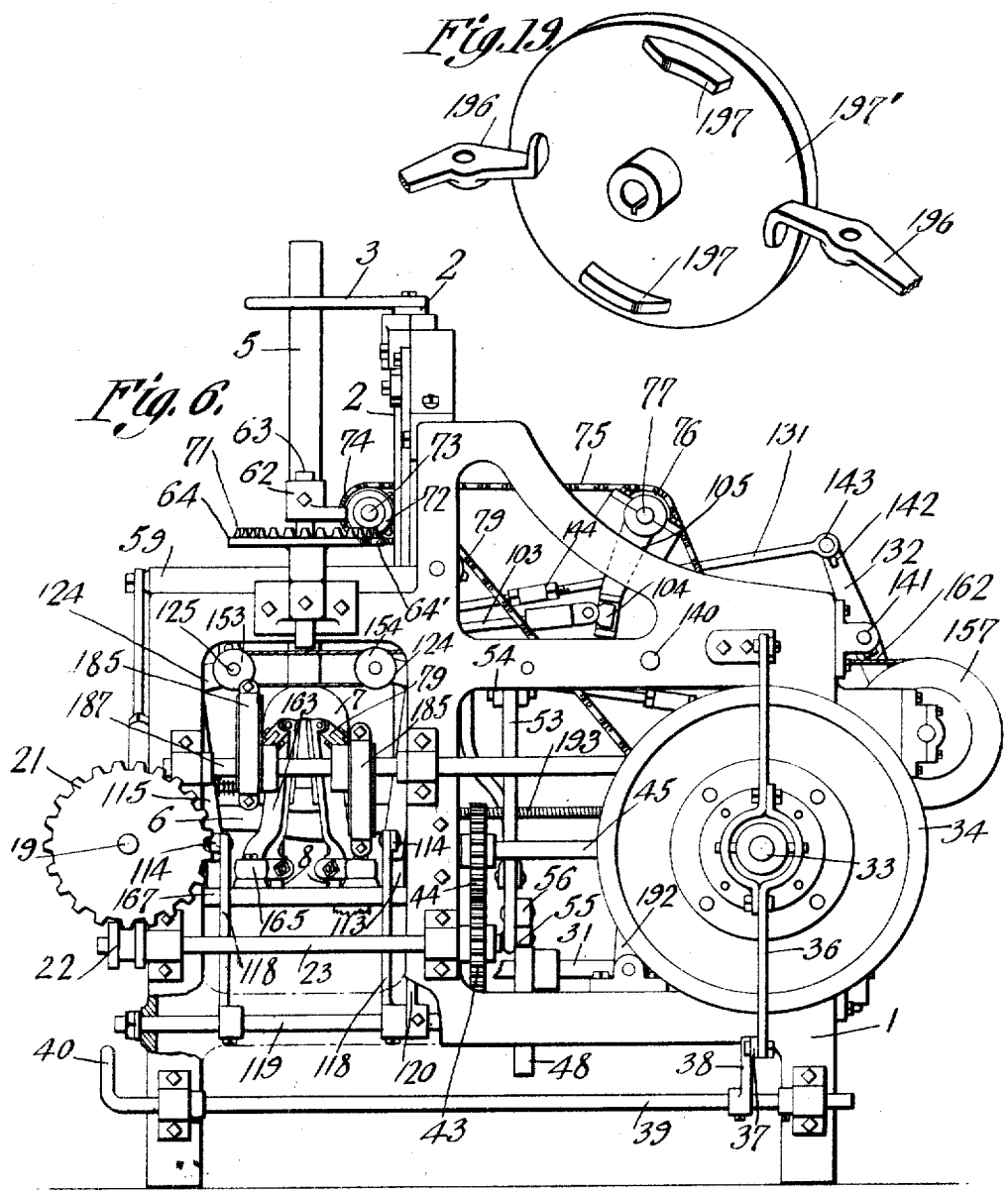

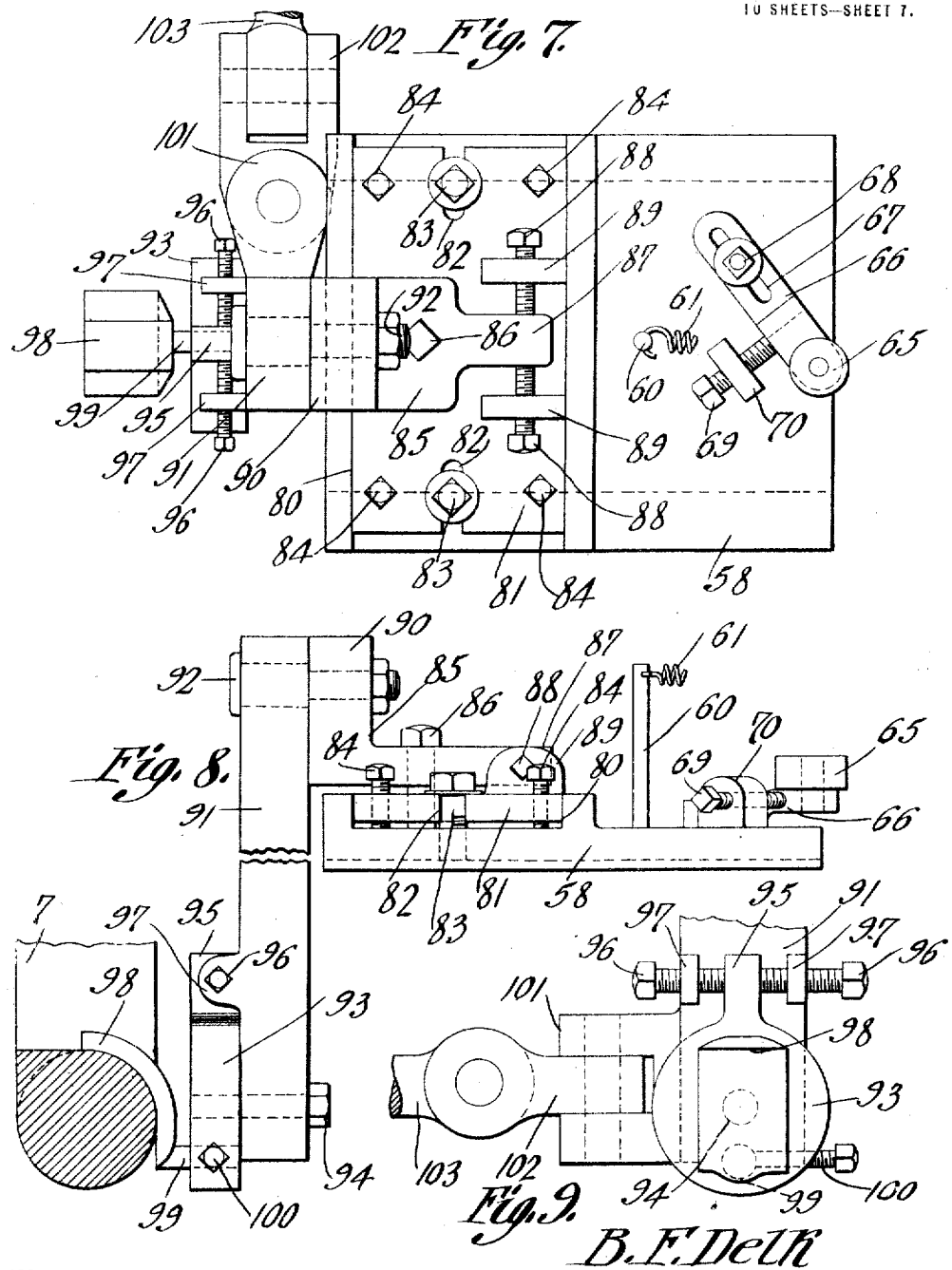

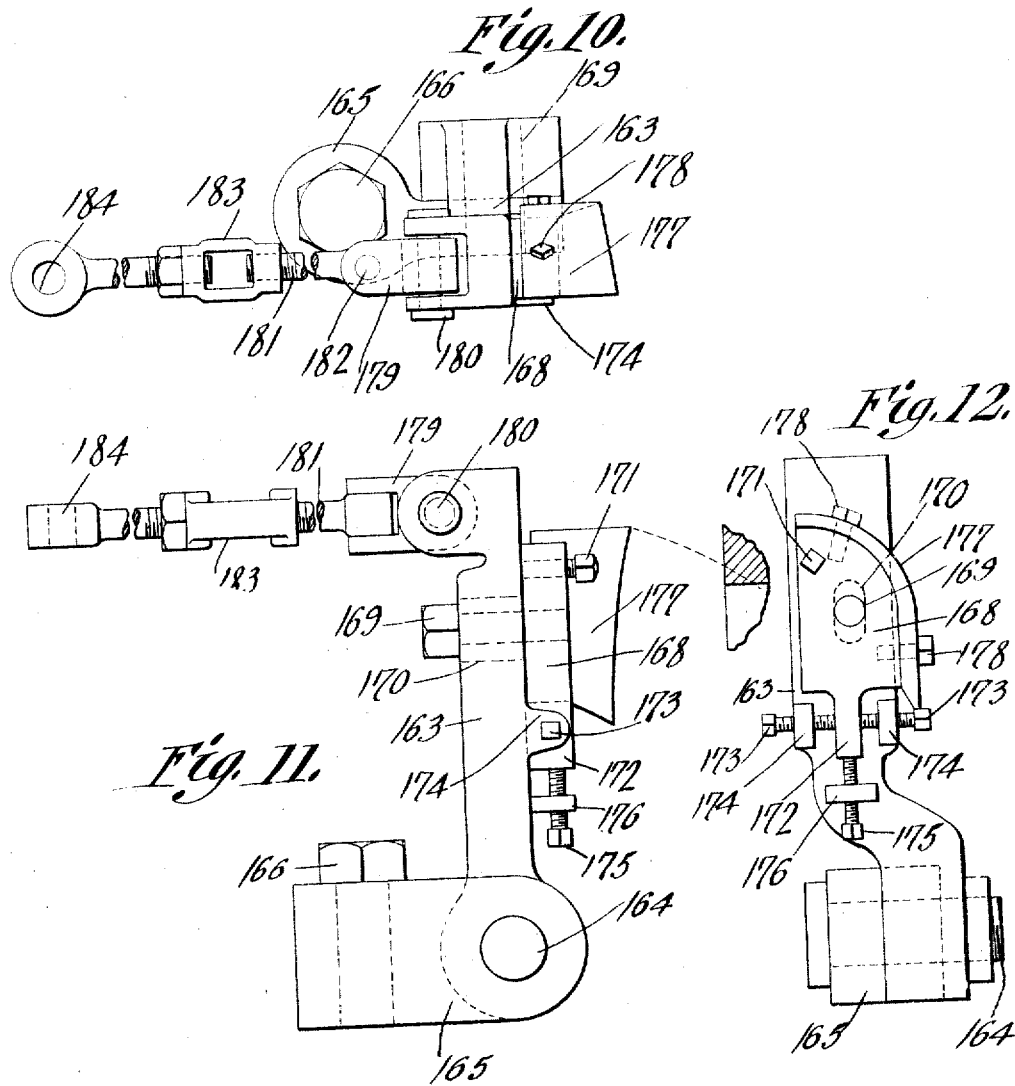

B. F. DELK.
D-HANDLE FINISHING MACHINE.
APPLICATION FILED NOV. 3, 1916.
1,260,344.
Patented Mar. 26, 1918.
10 SHEETS—SHEET 9.
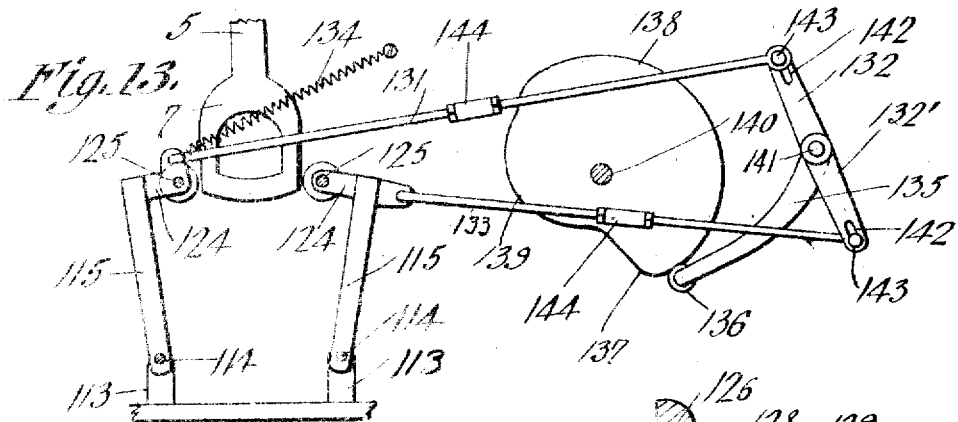
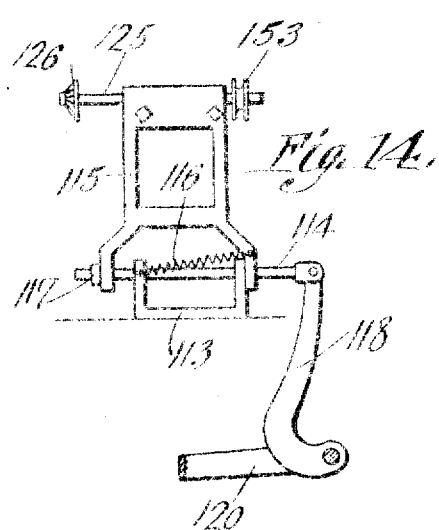
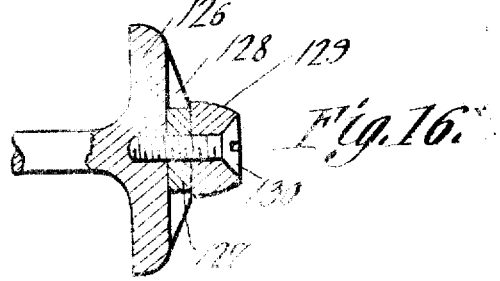
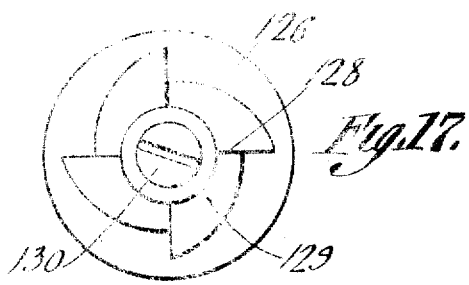
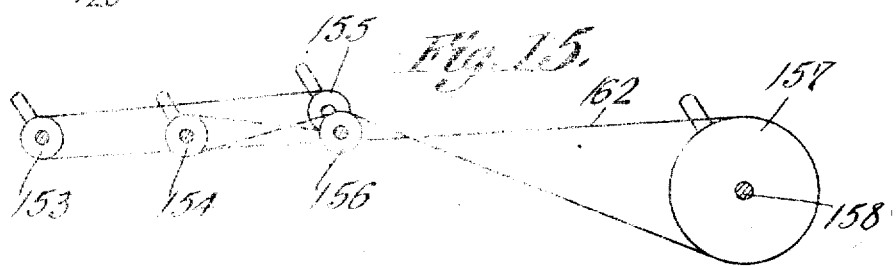
B. F. Delk, Inventor
Attorneys

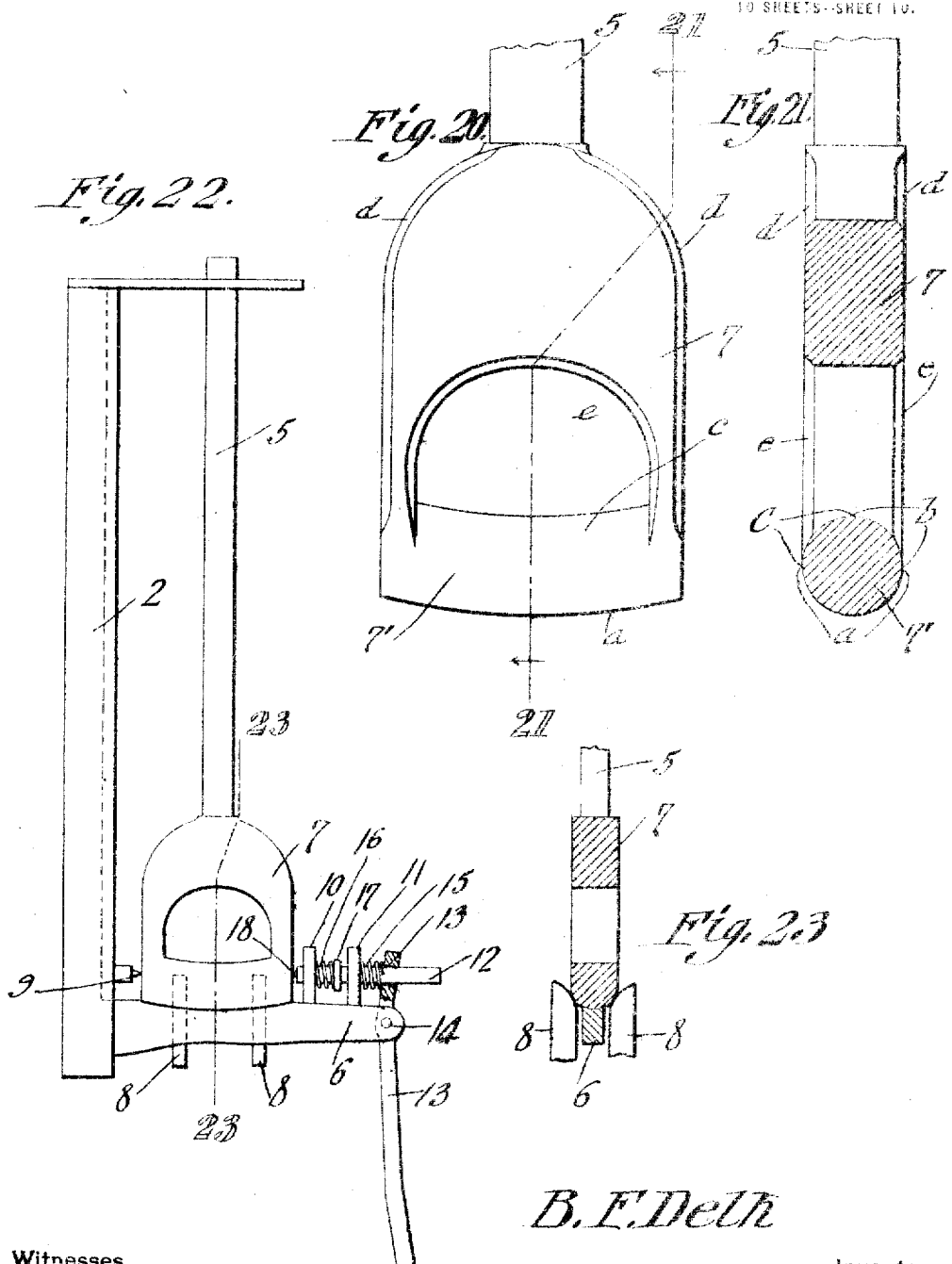

UNITED STATES PATENT OFFICE.

BERTIE FRANCIS DELK, OF MACON, GEORGIA, ASSIGNOR TO D-HANDLE FINISHING MACHINE CO., OF MACON, GEORGIA.

D-HANDLE-FINISHING MACHINE.

1,260,344.   Specification of Letters Patent.   Patented Mar. 26, 1918.

Application filed November 3, 1916. Serial No. 129,377.

*To all whom it may concern:*

Be it known that I, BERTIE F. DELK, a citizen of the United States, residing at Macon, in the county of Bibb and State of Georgia, have invented a new and useful D-Handle-Finishing Machine, of which the following is a specification.

The present invention appertains generally to wood working machines and aims to provide a machine for finishing D-handles, such as used for shovels, spades and similar implements, it being the object of the invention to finish the handles mechanically, to save labor and expense, and to do the work as perfect if not better than done by hand, and employing only unskilled labor.

The machine embodies in its essential features, novel means for rounding the inside of the grip of the handle, novel means for chamfering the inner edges of and novel means for chamfering the outer edges of the handle, and novel means for receiving, centering and moving the handle for the several operations.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Fig. 2 is a bottom plan view thereof.

Fig. 3 is a front view.

Fig. 4 is a rear view.

Fig. 5 is a side elevation.

Fig. 6 is a side elevation looking from the opposite side.

Fig. 7 is a plan view of one of the two devices for rounding the inside of the grip.

Fig. 8 is a side elevation of the device illustrated in Fig. 7.

Fig. 9 is a detail view of said device.

Fig. 10 is a plan view of one of the four devices for chamfering the inner edges of the handle.

Fig. 11 is a side elevation of the device shown in Fig. 10.

Fig. 12 is another elevation of the device shown in Figs. 10 and 11, looking at right angles to the line of view in Fig. 11.

Fig. 13 is a side elevation of one of the devices for chamfering or beveling the outer edges of the handle.

Fig. 14 is another elevation of the device shown in Fig. 13, looking at right angles to the line of view in Fig. 13.

Fig. 15 is a diagrammatic view illustrating the operating means for a pair of the frizzers.

Fig. 16 is a sectional detail of one of the frizzers.

Fig. 17 is a face view of the frizzer shown in Fig. 16.

Fig. 18 is an elevation of the device for raising and lowering the handle carrying shaft.

Fig. 19 is a perspective view of the device for operating the clutches which control the operation of the cutters for chamfering the inner edges of the handle.

Fig. 20 is a side elevation of the finished handle forming the product of the machine.

Fig. 21 is a section on the line 21—21 of Fig. 20.

Fig. 22 is an elevation of the device for holding the handle for the various operations.

Fig. 23 is a section on the line 23—23 of Fig. 22.

Figure 1:
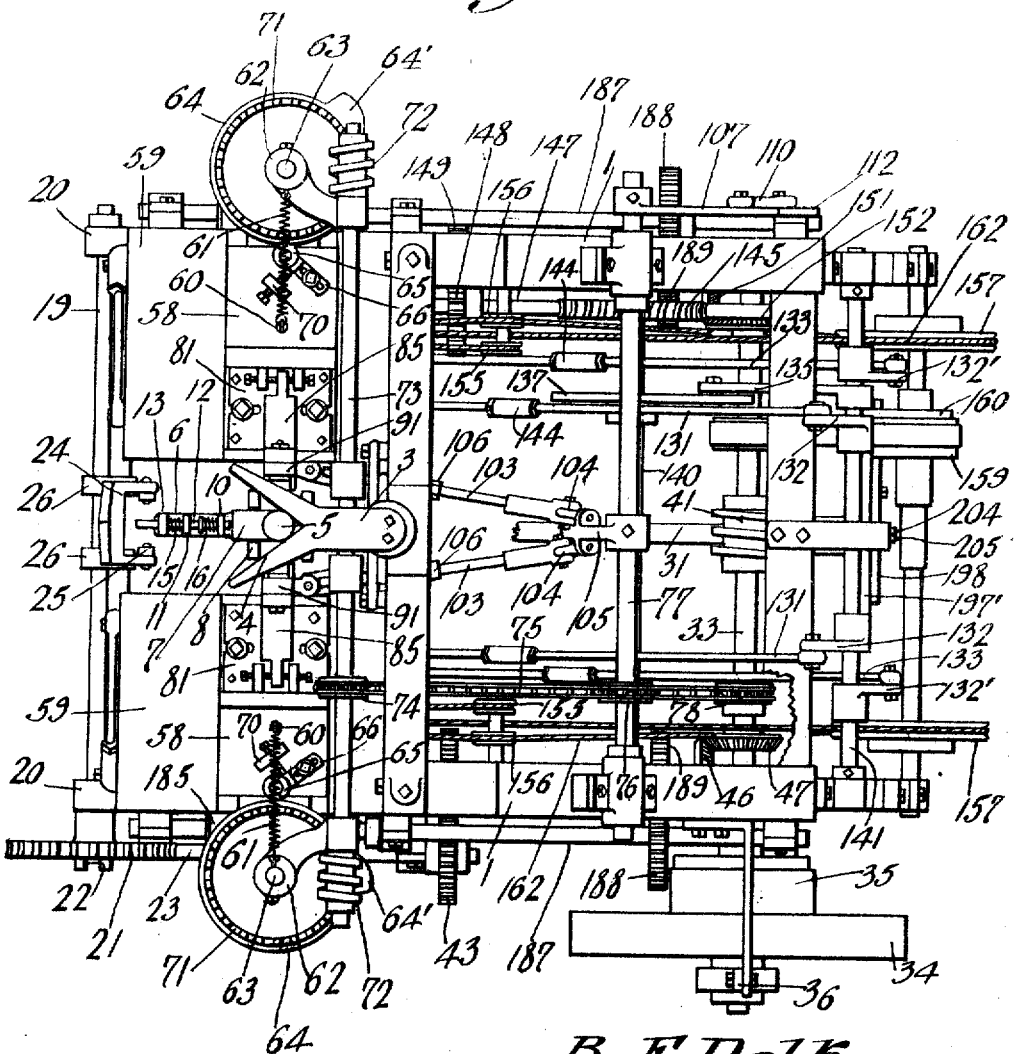
Figure 1 is a top plan view of the machine.

In carrying out the invention, the machine embodies a suitable frame 1, and a vertical handle carrying shaft 2 is slidable in the frame intermediate the sides thereof and adjacent to the forward end thereof. A forwardly projecting fork 3 has its shank secured upon the upper end of the shaft 2 and provides a V-shaped member 4 for receiving and centering the shank 5 of the handle which projects upwardly, the handle being placed in the machine with the grip lowermost. Secured to the lower terminal of the shaft 2 is a forwardly projecting bracket 6 upon which the grip of the handle 7 is seatable with the handle in a longitudinal vertical plane, and the frame has upstanding centering guides 8 at the opposite sides of the bracket 6 to receive said bracket when the shaft 2 is in its lowermost position, and to bring the handle 7 into the proper longitudinal vertical plane when the handle is inserted with the bracket 6 lowered between the guides 8.

As a means for holding the handle 7 in proper position upon the bracket 6, the shaft 2 has a forwardly projecting spur 9 immediately above the butt end of the bracket 6, to engage the rear end of the grip of the handle, and the bracket 6 is provided with upstanding guide lugs 10 and 11 near its free end and in front of the handle, a longitudinal rod 12 being slidable through the lugs 10—11 and having a spur 18 at its rear end to engage the forward end of the handle grip. A lever 13 having a relatively long depending arm is fulcrumed, as at 14, to the free end of the bracket 6, and has a short upwardly projecting arm provided with an aperture 13' through which the forward terminal of the rod 12 extends. A coiled wire expansion spring 15 surrounds the rod 12 between the lug 11 and upper arm of the lever 13, to swing said upper arm forwardly and the lower arm of the lever rearwardly, whereby the upper arm will grip the rod 12 and prevent the forward movement thereof. The rod 12 is spring pressed to move forwardly by means of a coiled wire expansion spring 16 surrounding it and confined between the lug 10 and a collar 17 secured upon the rod between the lugs 10 and 11. When the rod 12 is moved toward the left, as seen in Fig. 22, against the tension of the spring 16, the upper arm of the lever 13 in engaging the rod can readily swing toward the left against the tension of the spring 15, said lever being moved in engagement with the rod 12 by its spring 15. Consequently, the upper arm of the lever 13 in being swung toward the right by the spring 15 will grip or bind the rod 12 to prevent the movement thereof toward the right unless the lower arm of the lever 13 is swung toward the right to swing the upper arm thereof toward the left whereby to remove the corners of the upper arm of the lever 13 formed by the aperture 13' from the rod 12. Said corners when engaged with the rod 12 by the influence of the spring 15 will grip said rod and prevent the movement thereof toward the right, since when the rod tends to move toward the right under the influence of spring 16, this will only cause the lever 13 to more tightly grip the rod.

The machine is provided with means for automatically moving the rod 12 into engagement with the handle and for releasing it at the proper time. Thus, a transverse shaft 19 is journaled in bearings 20 carried by the forward end of the frame, and is operated by means of a worm wheel 21 carried by one end thereof and meshing with a special worm 22 secured upon a longitudinal shaft 23 carried by the frame at the left side thereof. As seen in Fig. 2, the worm 22 is of special form, whereby instead of imparting a slow continuous rotary movement to the worm wheel 21, it imparts a relatively fast intermittent motion thereto, which is preferable to correspondingly rotate the shaft 19. An inverted U-shaped driving member 24 has its ends fulcrumed to the frame at 25, with the intermediate portion of said member 24 in position to move rearwardly against the forward end of the rod 12 when the handle carrier or shaft 2 is in its lowermost or handle receiving position. Cams 26 are secured upon the shaft 19 to bear against the limbs of the member 24, and the shaft 19 is so rotated that the cams 26 are brought into operation for swinging the member 24 rearwardly at the proper time. When the member 24 is forced rearwardly to move the rod 12 likewise, the spur 18 is brought into engagement with the handle 7, thus moving the handle into engagement with the spur 9, and this will bring the handle into the proper position longitudinally of the bracket 6, the spurs 9 and 18 having stops at their bases for contacting with the handle to hold the handle in proper place. The shaft 2 is feathered to the frame or is of non-circular cross section to prevent the rotation thereof, whereby the handle is constrained to move in the proper vertical line. The upper arm or grip of the lever 13 permits the rod 12 to move rearwardly, but has a gripping or binding action on the rod to prevent the forward movement thereof under the tension of the spring 16 which tends to release the rod or its spur 18 from the handle. Thus, when the rod 12 is moved rearwardly, it is held in engagement with the handle by the gripping lever 13.

The means for moving the lever 13 to release its hold or grip on the rod 12, embodies a longitudinal push rod 27 slidable in guides 28 carried by the frame below the bracket 6, said rod 27 being moved rearwardly by a spring 29, and being located in such a position that when the shaft 2 is in its lowermost position, the lower end of the lever 13 depends immediately in front of the forward end of the rod 27. The rod 27 is moved forwardly at the proper time by means of a cam disk 30 carried by the forward end of a lower longitudinal shaft 31 journaled to the lower portion of the frame, said disk 30 carrying a cam 32 which engages the rear end of the rod 27 and moves it forwardly at the time that it is desired to release the handle. When the rod 27 is moved forwardly, it strikes the lower end of the lever 13 and swings the lower arm of said lever forwardly, thereby swinging the upper arm or grip of the lever rearwardly, which will release the rod 12, so that the spring 16 is brought into play for moving the rod 12 forwardly. This releases the spur 18 from the handle, so that the handle can be removed. The lever 13 is moved into gripping engagement with the rod 12 under the influence of the spring 15, and the spring 16 holds the rod 12 in released position until again driven rearwardly by the driving member 24.

The shaft 31 is driven from a transverse driving shaft 33 journaled to the frame adjacent to the rear end thereof, and connected by a suitable reduction gear with the shaft 31. Thus, the shaft 33 can be rotated at a relatively high speed, while the shaft 31 rotates at a slower velocity, the successive operations being carried out while the shaft 31 makes one revolution. As a suitable reduction gear between the shafts 31 and 33, a worm 41 is secured upon the shaft 33 and meshes with a worm wheel 42 secured upon the shaft 31. The shaft 33 is operated by an engine, motor or other prime mover, and for this purpose a pulley wheel 34 is mounted loosely upon one terminal of the driving shaft 33, and is adapted to be belted or otherwise connected with the prime mover. A suitable clutch 35 is employed for connecting the pulley wheel 34 and shaft 33, and is controlled by a lever 36 fulcrumed to the frame at the left side thereof, at which side the pulley wheel 34 is located, and the lower free end of the lever 36 is connected by a link 37 with an arm 38 of a longitudinal rock shaft 39 carried by the left side of the frame near the lower end of its legs. The forward end of the rock shaft 39 has a treadle 40 extending in front of the frame, and is adapted to be depressed by the operator for operating the clutch 35. The clutch 35 is thus readily operated for bringing the shaft 33 into and out of operation, the pulley wheel 34 rotating continuously during the operation of the machine. The shaft 23 is driven from the driving shaft 33, and for this purpose, a gear wheel 43 is secured to the rear end of the shaft 23 and meshes with a gear wheel 44 secured upon a longitudinal shaft 45 journaled within the frame adjacent to the left side thereof. A bevel gear 46 secured to the rear end of the shaft 45 meshes with a bevel gear 47 secured upon the driving shaft 33. The worm 22 and worm wheel 21 provide a reduction gear whereby the shaft 19 rotates once for each revolution of the shaft 31.

A device (illustrated in Fig. 18) is employed for raising and lowering the handle carrier or shaft 2. This device embodies a cam 48 secured upon the shaft 31 between the ends of the frame, and said cam has an inner concentric portion 49, a cam portion 50 extending outwardly from the portion 49 to an outer concentric portion 51, and a cam portion 52 extending inwardly from the portion 51 to the portion 49, to complete the outline of the cam. A lever 53 is fulcrumed at one end, as at 54, to the frame adjacent to the left side thereof, and projects inwardly and downwardly to engage the cam 48, said lever 53 having rollers 55 and 56 to ride upon the cam. A link 57 connects the lever 53 and shaft 2, and is provided with an adjusting turn buckle 57'. As the cam 48 rotates, the roller 55 in engaging the inner concentric portion 49 will hold the shaft 2 stationary in lowermost position, and as the portion 50 engages the rollers 55 and 56, the shaft 2 is raised quickly to its uppermost position, and is held stationary in uppermost position during the engagement of the rollers with the outer concentric portion 51. The rollers in engaging the cam portion 52 permit the lever 53 to swing downwardly whereby the shaft 2 is moved downwardly in the proper manner for the successive actions of the cutters on the handle.

The first cutting operation is to finish the inside of the handle grip when the handle is in its uppermost position. This is accomplished by the devices which will be described presently.

There are two of these devices, one being a right hand one and the other the left hand one, being disposed at the right and left hand sides of the frame at the opposite sides of the handle when in position. Each of these devices embodies a flat carriage 58 slidable transversely toward and away from the handle upon a shelf 59 of the frame, there being two spaced shelves for the two carriages 58. Each carriage 58 is normally moved outwardly toward the side of the frame, and for this purpose, the carriage has an upstanding post 60 connected by a coiled wire retractile spring 61 with a bearing bracket 62 through which a short vertical shaft 63 is journaled at the respective side of the frame. The shaft 63 carries a horizontal cam disk 64 having an outstanding cam 64', the cams 64' of the two devices being so located that they are brought into operation in succession. Each carriage 58 has a roller 65 at its outer end bearing against the edge of the respective cam disk 64 under the action of the spring 61. This roller 65 is mounted upon an adjustable bracket 66 having a longitudinal slot 67 through which a clamping bolt 68 extends, said bolt being carried by the carriage, and when loosened, permitting the bracket 66 to be adjusted longitudinally of itself and to various angles for properly positioning the roller 65, to control the movement of the carriage 58 by the cam disk 64. To prevent the displacement of the roller 65 by the pressure of the cam 64' thereagainst, an adjusting screw 69 is threaded through an upstanding lug 70 with which the carriage is provided, and bears against the bracket 66 to prevent the inward movement thereof. The screw 69 also facilitates the adjustment of the bracket 66. When the cam 64' engages the roller 65 it serves to push the carriage 58 inwardly to bring the respective grip-finishing cutter into operation.

In order to operate the cam disks 64, they are provided upon their upper surfaces, with teeth 71 providing worm wheels which mesh with worms 72 secured upon the terminals of a transverse shaft 73 journaled in the bearing brackets 62 and other suitable bearings of the frame. A sprocket wheel 74 is secured upon the shaft 73, and a sprocket chain 75 extends around the sprocket wheel 74 and over a sprocket wheel 76 rotatable loosely upon a transverse rock shaft 77 journaled to the frame at the top thereof. From the sprocket wheel 76, the sprocket chain 75 extends downwardly under a sprocket wheel 78 secured upon the driving shaft 33, and that run of the chain between the sprocket wheels 74 and 78 passes over an idler sprocket wheel 79 carried by the frame. The shaft 73 is thus connected to the driving shaft 33 to be operated thereby, and the worms 72 in engaging the teeth 71 of the cam disks 64, provide a proper reduction gearing so that the cam disks 64 rotate once for each revolution of the shaft 31.

Each carriage 58 has a transverse guide channel 80 disposed longitudinally of the machine, and in which a plate or supplemental carriage 81 is slidable forwardly and rearwardly when loosened for purpose of adjustment. The plate 81 has longitudinal slots 82 receiving clamping bolts 83 carried by the carriage 58, to clamp the plate 81 in place, and adjusting screws 84 are threaded downwardly through the plate 81 adjacent the corners thereof, and seat upon the carriage 58 for raising the corner portions of the plate 81 for purpose of adjustment, the bolts 83 being loosened while the screws 84 are adjusted and being tightened after the screws are adjusted, to clamp the plate 81 in place. The plate 81 can be adjusted forwardly and rearwardly and can be tilted in various directions by properly adjusting the screws 84 and sliding the plate 81 upon the carriage. The adjustment of the plate 81 is used for adjusting the corresponding grip-finishing cutter.

Seated upon the plate 81 is the base of an angular bracket 85 pivotally mounted upon a vertical clamping bolt 86 carried by the plate 81, said bolt 86 serving as a pivot for the bracket 85 and also serving to clamp said bracket upon the plate 81. The bracket 85 has an outwardly projecting tail piece or extension 87 disposed between a pair of adjusting screws 88 threaded through upstanding lugs 89 carried by the plate 81, said screws 88 clamping the tail piece 87 therebetween, and serving to adjust the bracket 85 angularly about a vertical axis. The inner end of the bracket 85 has an upstanding portion 90 to the inner side of which a hanger or arm 91 is pivoted. The portion 90 carries an inwardly projecting shouldered bolt or pivot 92 upon which the upper end of the hanger 91 is pivoted, the hanger 91 thus being swingable forwardly and rearwardly about a transverse axis. The plane in which the hanger 91 moves is determined by the angular adjustment of the bracket 85, and the adjustment of the plate 81. The grip-finishing cutter is carried by the lower end of the hanger 91, and for this purpose, a flat circular head or block 93 has one face resting against the inner side of the lower end portion of the hanger 81, and is pivoted and clamped to said hanger 91 by means of a bolt 94 extending loosely through the hanger 91 and threaded into the head 93. When the bolt 94 is loosened, the head 93 can be adjusted angularly about a substantially transverse axis, and when the bolt 94 is tightened, the head 93 is clamped against the hanger 91 to hold it firmly against the hanger. The head 93 has an upstanding tail piece or extension 95 engaged by a pair of opposite adjusting screws 96 threaded through inwardly projecting lugs 97 carried by the hanger 91. By adjusting the screws 96, the angular position of the head 93 can be adjusted accurately, and the screws 96 also serve to prevent the accidental displacement of the head 93.

There are two grip-finishing cutters 98, one right hand and one left hand, and they are carried by the respective heads 93 of the two hangers 91. Each cutter 98 has opposite cutting edges and is curved to properly finish the respective half of the inside of the handle grip, as suggested in Fig. 8, and the cutter 98 is provided at one end with a shank 99 of circular cross section fitting adjustably in an aperture in the head 93 below the pivot bolt 94. The shank 99 is held adjustably in its aperture by means of a set screw 100 carried by the head 93, the set screw when loosened permitting of the longitudinal and angular adjustment of the shank 99 to correspondingly adjust the cutter 98. The cutter 98 is curved upwardly and inwardly from the shank 99 to enter the opening of the handle and trim the corresponding half of the inside of the grip.

The hangers 91 are oscillated forwardly and rearwardly to oscillate or reciprocate the cutters 98 parallel with the handle grip, said cutters being moved through arcs of curvilinear strokes to properly trim the handle grip which is curved longitudinally of itself. Thus, the lower terminals of hangers 91 have rearwardly projecting ...

101 to which coupling members 102 are pivoted by substantially vertical pivots, and links 103 are pivoted to the members 102 by substantially transverse horizontal pivots, whereby to provide universal joints between the hangers and links 103. The rear ends of the links 103 are connected by similar universal joints 104 with a depending arm 105 secured to the rock shaft 77. The links 103 have turn buckles 106 for purpose of adjustment, to regulate the throw or stroke of the levers 91. The rock shaft 77 is oscillated by means of an arm 107 secured to the right hand end thereof, and having a longitudinal slot 108 adjustably receiving a pivot 109 to which the upper end of a pitman 110 is connected. The lower end of said pitman is connected to a wrist pin 111 outstanding from a crank disk 112 secured to the right hand end of the driving shaft 33. The rotation of the wrist pin 111 reciprocates the pitman 110 to oscillate the arm 107 and rock shaft 77, and the links 103 are thus reciprocated for oscillating the hangers 91 and their cutters 98 relatively fast, there being no reduction gearing between the driving shaft 33 and the cutters 98.

A pair of right and left hand devices is provided for chamfering or beveling the outer edges of the handle at the opposite sides thereof during the downward movement of the handle from its uppermost position. These devices embody guides 113 carried by the frame 1 at the opposite sides of the line of movement of the handle, and transverse rods 114 are slidable longitudinally in the guides 113, there being a pair of said rods at each side, and the rods of each pair being parallel with one another. The rods are spaced apart longitudinally of the frame and are located in the same horizontal plane. An upwardly projecting oscillating frame 115 has its lower end mounted slidably and swingably upon each rod 114, said frames 115 being arranged in pairs at the opposite sides and being swingable forwardly and rearwardly about transverse axes. Coiled wire retractile springs 116 connect the frames 115 and guides 113 thereby to yieldably move the frames 115 inwardly, and the rods 114 carry collars 117 to limit the inward movement of the frames 115 and to carry said frames outwardly with the rods 114 when they are so moved. The remote ends of the rods 114 are pivotally connected with upwardly projecting arms 118 at the opposite sides secured upon longitudinal rock shafts 119 journaled to the opposite sides of the frame. Inwardly projecting arms 120 are secured to said rock shafts 119, and their adjacent free ends are connected together by a link 121, so that said arms are oscillated simultaneously. A cam 122 is carried by the cam disk 30 or shaft 31 to depress the arms 120 at the proper time to bring the frizzers into operation. The arms 120 are normally raised by coiled wire retractile springs 123 connecting them and the frame 1, whereby the arms 118 are normally swung outwardly to move the rods 114 likewise, and to carry the frames 115 outwardly to inoperative position.

The upper free ends of the frames 115 of each pair have brackets 124 projecting toward one another, and in which transverse frizzer shafts 125 are journaled, said shafts projecting inwardly and carrying the frizzers or rotatable chamfering cutters at their inner ends.

The frizzers are of special construction, there being four of them, two at each side. Thus, each shaft 125 is provided with a disk or flat head 126 at its inner end, and a cutter 127 rests snugly against the face of the disk 126 and has the radial tapered cutting edges 128. A washer 129 rests against the hub of the cutter 127, and a clamping screw 130 extends through the washer 129 and central aperture of the cutter 127 and takes into the disk 126 to clamp the cutter and washer in place. The washer 129 provides a roller to roll along the edge portion of the handle, while the face of the disk 126 is adjacent to the respective side or face of the handle.

In order to cause the frizzers to properly follow the outer edges of the handle during the downward movement of the handle, the frames 115 are oscillated properly through the medium of a suitably designed cam. Thus, the forward frames 115 are connected by links or rods 131 with upwardly projecting arms 132 secured upon a transverse rock shaft 141 journaled to the main frame 1 at the rear thereof. The rear frames 115 are connected by similar links or rods 133 with downwardly projecting arms 132' secured to the rock shaft 141, whereby the rock shaft 141 in being oscillated will swing the forward and rear frames 115 toward and away from one another. In order to operate the rock shaft 141, an arm 135 is secured thereto, and is provided with a roller 136 engaging the edge of a cam 137 secured upon a transverse shaft 140 journaled to the frame 1 below the rock shaft 77. The cam 137 has a concentric portion 138 which in swinging the lever or arm 135 will so move the links 131 and 133, to separate the forward and rear frames 115, whereby to remove the frizzers from the path of the handle to keep the frizzers out of operation until the proper time. The cam 137 has a cam portion 139 which when followed by the roller 136 will permit the shaft 141 to rock properly to cause the frames 115 to swing toward one another so that the frizzers follow the outer edges of the handle 7. The roller 136 is held against the cam 137 by means of coiled wire retractile springs 134 connecting the forward frames 115 and the main frame 1. The arms 132—132' have longitudinal slots 142 adjustably receiving the pivots 143 of the links 131 and 133, for purpose of adjustment, and said links are also provided with turn buckles 144 to adjust their lengths, whereby to adjust the movements of the frizzer frames 115.

The shaft 140 is rotated once for each revolution of the shaft 31, and for this purpose, a worm wheel 145 is secured upon said shaft adjacent to the right side of the frame and meshes with a worm 146 carried by a longitudinal shaft 147 journaled to the frame adjacent said side. A gear wheel 148 secured upon the shaft 147 meshes with a gear wheel 149 secured upon a longitudinal shaft 150 journaled to the frame below the shaft 147. The rear end of the shaft 150 carries a bevel gear 151 meshing with a bevel gear 152 secured upon the drive shaft 33. The worm 146 and worm wheel 145 provide the proper reduction gearing between the shafts 33 and 140.

In order to properly rotate each pair of frizzers, even during the movement of the frames 115 toward and away from one another, a pulley 153 is secured to the outer end of each forward shaft 125, and a pulley 154 is secured upon the outer end of each rear shaft 125, reference being had to the diagram in Fig. 15. A pair of idler pulleys 155 and 156 is carried by the frame in rear of each pair of pulleys 153 and 154, and a pulley 157 for each pair of frizzers is secured upon a transverse shaft 158 journaled to the frame at the rear end thereof. The shaft 158 carries a friction cone 160 and a friction clutch 159 is engageable with the friction cone 160 to bring the shaft 158 into operation at the proper time. An endless belt 162 is employed for each set of pulleys, and passes around the pulley 157. The belt 162 extends from the bottom of the pulley 157 over the idler pulley 156, thence under and around the pulley 154, thence under the idler pulley 155, thence over and around the pulley 153, thence back over the pulley 157, thus completing the circuit. By the provision of the idler pulleys 155 and 156, the slack of the belt is properly taken up when the pulleys 153 and 154 are moved toward one another, with the frizzer frames 115, and the belt is thus maintained taut during the movement of the frames 115 toward and away from one another to keep the shafts 125 in operation as the frizzers follow the outer edges of the handle.

A pair of right and left hand devices are also employed for chamfering or beveling the inner edges of the handle after the handle is moved downwardly to lower position, and the chamfering of the inner edges of the handle constitutes the final finishing operation. Each of these devices embodies a pair of upwardly projecting arms 163 disposed side by side longitudinally of the frame at the respective side of the line of movement of the handle, and the lower ends of the arms 163 are connected by substantially longitudinal pivots 164 with bearings 165 seated upon a shelf 167 of the frame 1 at the forward end thereof. Pivot and clamping bolts 166 extend through the bearings 165 for pivoting and clamping the same upon the shelf 167, it being noted that when the bolts 166 are loosened, the bearings 165 can be adjusted angularly about vertical axes, to regulate the plane in which the arms 163 are oscillated, thus to control the operation of the inside chamfering cutters. It may be stated here, that the shelf 167 also carries the upstanding guides 8, the driving member 24, the guides 28 underneath the same, the guides 113 and springs 123. The bearings 165 are located between the guides 113 and frames 115, and the arms 163 are adapted to oscillate between said frames 115 transversely of the machine.

A head or block 168 of proper shape rests against the inner side of each arm 163, and has threaded thereinto a pivot and clamping bolt 169 extending through a slot 170 in the arm 163, whereby when the bolt 169 is loosened, the head 168 can be adjusted angularly and vertically. The head 168 has a depending tail piece or extension 172 engaged by a pair of adjusting screws 173 threaded through inwardly projecting lugs 174 carried by the arm 163, to adjust the head 168 angularly about a substantially transverse axis, and to hold said head at various angular positions. An adjusting screw 175 is also threaded upwardly through an inwardly projecting lug 176 of the arm 163 and contacts with the lower end of the tail piece 172 to support the head 168, and to adjust the same vertically. A curved chamfering cutter 177 is secured to one edge of the head 168 by means of bolts 178 or other securing elements, and projects inwardly from the head 168. The cutters 177 of each pair complement one another to conform to the shape of the inner edge of the handle, and the strokes of the cutters 177 can be properly regulated by the various adjustments provided.

The arms 163 are oscillated transversely at the proper time, and for this purpose, coupling members 179 are connected by longitudinal pivots 180 with the upper ends of the arms 163, and links 181 are connected by vertical pivots 182 with the members 179, to provide universal joints between the links 181 and arms 163. Said links 181 have turn buckles 183 for adjusting the lengths thereof, to control the oscillation of the various arms 163. The remote ends of the two pairs or links 181 are pivoted, as at 184, to bands or eccentric straps 185 embracing cams or eccentrics 186 secured upon longitudinal shafts 187 journaled to the opposite sides of the frame. The cams 186 of each pair are in reversed positions, whereby the arms 163 of each pair are oscillated in opposite directions, to bring the knife cutters 177 of each pair into operation in succession rather than simultaneously. This enables each cutter 177 at each side to complete its cut without interference from the companion cutter. The arms 163 oscillate in planes at an acute angle relatively to one another, whereby the cutters 177 move into engagement with the handle along converging lines, and said cutters provide overlapping cuts, which necessitates the successive operation thereof.

In order to rotate the shafts 187, gear wheels 188 are secured thereto adjacent their rear ends and mesh with gear wheels 189 rotatable loosely upon the shafts 45 and 150 at the opposite sides of the frame, said shafts 45 and 150 being connected by the bevel gears with the driving shaft 33. The gear wheels 189 have clutch hubs 190 coöperable with clutch members 191 feathered upon the shafts 45 and 150, and upwardly projecting levers 192 are fulcrumed to the frame and are connected by suitable swivel joints with the clutch members 191 to move said clutch members into and out of engagement with the clutch hubs 190. Retractile springs 193 connect the levers 192 and frame 1 for normally pulling the levers 192 to remove the clutch members 191 from the clutch hubs 190. The levers 192 are connected by links 194 with cam operated levers 196, universal joints 195 being provided between the links 194 and lever 196. The levers 196 are operated at the proper time by cams 197 carried by a cam disk 197' secured to the rear end of the shaft 31. When the levers 196 are swung by the cams 197, the links 194 are pulled to swing the levers 192, thus bringing the clutch members 191 into engagement with the clutch hubs 190, to thereby connect the cam or eccentric shafts 187 with the driving shaft 33. When the shafts 187 are rotated, the cams 186 being rotated will oscillate the arms 163 thus bringing the cutters 177 into operation. Said cutters swing through arcs having the pivots 164 as centers, and the cutters are movable inwardly and downwardly to provide a chamfering cut.

The cam disk 197' also operates the clutch member 159 at the proper time, a cam 198 being carried by the disk 197' and being engageable with a roller 199 carried by a transverse sliding rod 200 movable in guides 201 carried by the rear end of the frame. A vertical lever 202 has its upper end fulcrumed, as at 204, to the frame 1, and its lower end is connected by a pin and slot connection, as at 203, with the rod 200. The lever 202 is pivoted between its ends, as at 205, to the clutch member 159. When the roller 199 is moved by the cam 198, the rod 200 is slid to the right, as seen in Fig. 4, thereby swinging the lever 202 to bring the clutch member 159 into engagement with the friction cone 160. The clutch member 159 acts as a pulley wheel and is connected by a belt 206 to a pulley wheel 207 secured upon the driving shaft 33, so that when the clutch member 159 is moved into engagement with the friction cone 160, the shaft 158 will be rotated, to operate the frizzers.

Before taking up the operation of the machine, reference is had to Figs. 20 and 21, to point out the work done by the machine. The outside $a$ of the grip 7' of the handle 7 is finished before the handle is introduced in the machine, and the two halves $c$ and $b$ are finished in succession by the grip-finishing cutters 98, it being noted that the grip 7' is curved longitudinally and is of circular cross section. The second finishing operation resides in the chamfering, as at $d$, of the outside edges or corners of the handle 7, which is done by the frizzers. The third cutting operation resides in the chamfering of the inner edges or corners, as at $e$, which is done by the chamfering cutters 177.

The operation of the machine is as follows:

Assuming that the shaft 2 is in its lowermost position, with the rod 12 in released position, the handle which is in the machine, if there is one, can be readily removed, and the next handle brought into place. During the interval of changing handles, the treadle 40 can be operated for disconnecting the pulley 34 from the driving shaft 33, so that the various mechanisms will be at a standstill. The handle 7 is placed on the bracket 6, being brought into the proper longitudinal vertical plane by the guides 8 between which the handle is introduced, and the upstanding shank 5 being brought into the member 4 will be centered properly. The machine is then set in motion by the operation of the treadle 40, and the cams 26 then swing the driving member 24 against the rod 12 to push said rod rearwardly and force the spur 18 into the handle 7, said handle being thereby also forced into engagement with the spur 9. This will clamp and hold the handle in proper position upon the bracket 6, the gripping lever 13 holding the rod 12 in engagement with the handle. The cam 48 now raises the lever 53 to raise the shaft 2 to its uppermost position, and the shaft 2 is held for a sufficient period of time in its uppermost position for the operation of the grip-finishing cutters 98. While the handle is in its uppermost position, the cams 64' push the carriages 58 inwardly in succession. Thus, one carriage 58 is first moved inwardly, its hanger 91 being oscillated in the meantime, and this brings the respective cutter 98 into the opening of the handle, and said cutter being reciprocated or oscillated will cut the wood away and round off or finish one-half of the inside of the handle grip 7'. Said carriage 58 is then retracted by the respective spring 61 after the cam 64' has passed the respective roller 65, and the other cam 64' then moves the other carriage inwardly to bring its cutter 98 into operation for finishing the remaining half of the inside of the handle grip.

After the grip is thus finished, the shaft 2 is fed downwardly due to the travel of the rollers of the lever 53 on the portion 52 of the cam 48. The handle is thus gradually lowered for the operation of the frizzers thereon. Thus, during the lowering of the handle, the cam 122 depresses the arms 120 and slides the rods 114 inwardly so that the springs 116 slide the frames 115 inwardly. This brings the frizzers into operative position, and at the same time the cam 198 moves the roller 199 to bring the clutch member 159 into engagement with the friction cone 160, thus operating the frizzers, and the cam 137 is brought to a position so that the springs 134 move the links 131 rearwardly to rock the shaft 141. This rocking movement of the shaft 141 serves to swing the forward and rear frames 115 toward one another gradually at first and then with a final accelerating movement so that the frizzers follow the outer edges of the handle. The frames 115 are thus brought into operative position to bring the frizzers into engagement with the outer corners or edges of the handle 7, and as the handle is moved downwardly, the frizzers are moved toward one another to follow the edges of the handle, and the frizzers being rotated will chamfer or bevel said edges. When the handle is lowered to bring the frizzers adjacent to the shank 5, the cam 137 swings the arm or lever 135 to remove the frizzers from the handle by swinging the frames 115 forwardly and rearwardly away from one another. The cam 122 is also moved to let the arms swing upwardly to pull the rods 114 and frames 115 outwardly. When the frizzers are removed from the handle, the cam 198 also releases the roller 199, so that the friction clutch member 159 disengages the friction cone 160, so that the frizzers stop rotating.

The handle is then returned to lowered position, for the operation of the cutters 177. At this moment, the cams 197 swing the levers 196 to throw the clutch members 191 into engagement with the clutch hubs 190 thereby rotating the shafts 187 for operating the cams 186, and this operates the opposite arms 163 in succession, so that first one cutter 177 of each pair is moved into the opening of the handle to cut away the respective portion of the inner edge or corner of the handle, and then the other cutters 177 are brought into operation to complete the chamfering or beveling of the inner edges of the handle. When the cutters 177 are returned to normal position, the cams 197 release the levers 196, and the clutch members 191 are then moved to released positions by the springs 193. The handle is now in its finished condition, ready for removal.

When the handle is thus finished, the cam 32 pushes the push rod 27 forwardly, to swing the lower arm of the lever 13 forwardly, thereby causing said lever to release the rod 12, which will at once spring forwardly under the action of the spring 16, thereby releasing the handle and permitting it to be removed and replaced by the next one for a new operation.

The present machine does perfect work, finishing the handle even better than can be done by hand, and skilled labor is unnecessary. The machine effects a decided saving in the cost of operations in finishing the edges of the handle and the inside of the grip, and the various cutters are mounted for proper operation upon the handle and can be adjusted to a nicety for properly carrying out their functions. Various means can be used for bringing the several cutters into operation other than those herein disclosed, and other changes and alterations can be made within the scope of the appended claims, without departing from the spirit of the invention.

Having thus described the invention, what is claimed as new is:—

1. A D-handle finishing machine embodying a movable shaft, a bracket carried thereby for the engagement of the grip of a D-handle, a member carried by said shaft for centering the shank of said handle, a spur carried by the shaft for the engagement of the handle at one end of its grip, a slidable rod carried by the bracket and having its spur to engage the opposite portion of the handle at the other end of the grip, means tending to slide said rod to released position, means for holding said rod when moved into engagement with the handle, means for moving said rod into engagement with the handle, means for releasing the holding means of said rod, guides between which the bracket is movable for bringing the handle into the proper plane when applied to the bracket, and handle finishing means to operate upon the handle.

2. A finishing machine embodying means for holding an article to be operated on, a slide movable toward and away from said means, an oscillatory member, means for pivotally and adjustably connecting said member with the slide and operable to change the plane of oscillation of said member when in operative position, a non-rotatable cutter carried by said member and constructed to have a cutting action by its reciprocatory movement, means for moving said slide back and forth, and means for oscillating said member during the engagement of the cutter with the article.

3. A finishing machine embodying means for holding an article to be operated on, a slide movable toward and away from said means, means for moving the slide back and forth, an oscillatory member, means for pivotally and adjustably connecting said member with the slide for movement therewith, and constructed to adjust said member for oscillation in different planes with respect to the holding means when in operative position, a non-rotatable cutter constructed to have a cutting action by its reciprocatory movement in engagement with the article, means for attaching said cutter to said member and constructed for the adjustment of the cutter in various directions with respect to said member, and means for oscillating said member during the engagement of the cutter with the article.

4. A finishing machine embodying means for holding and moving an article to be operated on, a pair of movable members mounted for movement in one direction toward and away from each other and for movement in another direction toward and away from said holding means, a rotary cutter carried by each of said members, means connected to both cutters for rotating them, means connected to both of said members for simultaneously swinging them in the first mentioned direction toward and away from one another to follow the edges of the article, and means connected to both of said members for simultaneously moving them in the second mentioned direction toward and away from the holding means to bring them simultaneously into and out of engagement with the article.

5. A finishing machine embodying means for holding and moving an article to be operated on, a pair of movable members mounted for movement in one direction toward and away from each other and for movement in another direction toward and away from said holding means, a rotary cutter carried by each of said members, means for rotating said cutters, a cam, means operated by said cam and connected to both of said members for simultaneously moving them relatively toward each other in the first mentioned direction to follow certain edges of the article, spring means for moving said members toward the article in the second mentioned direction to bring the cutters into engagement therewith, and means for retracting said members against the tension of said spring means.

6. A finishing machine embodying means for holding and moving an article to be operated on, means movable toward and away from said holding means in one direction, a pair of oscillatory members carried by the second mentioned means for movement toward and away from each other in another direction, a rotary cutter carried by each of said members, means for moving the second mentioned means back and forth relatively to the holding means in the first mentioned direction, means for rotating the cutters, and means connected to said members for simultaneously swinging them toward and away from each other in the second mentioned direction to follow certain edges of the article.

7. A finishing machine embodying means for holding and moving an article to be operated on, a pair of rods movable toward and away from said holding means in one direction, a pair of oscillatory members mounted on said rods for movement toward and away from each other in another direction, rotary cutters carried by said members, spring means for moving said members toward the holding means in the first mentioned direction to bring the cutters into the plane of operation, said members being movable away from the holding means with the rods, means for moving the rods, means for rotating the cutters, and means connected to both of said oscillatory members for moving them relatively to each other in the second mentioned direction to follow certain edges of the article.

8. A finishing machine embodying means for holding an article to be operated on, a pair of cutters mounted at the same side of said means for movement side by side toward and away from said means in the same general direction and to provide overlapping cuts when engaged with the article, and means for moving the cutters into engagement with the article in succession.

9. A finishing machine embodying means for holding an article to be operated on, a pair of members at the same side of said means movable along converging lines side by side toward the holding means, cutters carried by said members to provide overlapping cuts when engaged with the article, and means for moving said members in succession toward and away from the holding means.

10. A finishing machine embodying means for holding an article to be operated on, a pair of oscillatory members swingable along converging lines toward the holding means, means for pivotally and adjustably supporting said members for oscillation toward and away from the holding means in different planes relatively thereto, actuating means, flexible and adjustable connections between the actuating means and said member for oscillating them in succession, cutters for engaging the article to provide overlapping cuts, and adjustable means for attaching the cutters to the oscillatory members for the adjustment of the cutters in various directions relatively to said members.

In testimony that I claim the foregoing as my own, I have hereto affixed my signature in the presence of two witnesses.

BERTIE FRANCIS DELK.

Witnesses:
L. P. JACKSON,
A. D. SCHOFIELD, Jr.